United States Patent
Chan et al.

[11] Patent Number: 5,601,491
[45] Date of Patent: Feb. 11, 1997

[54] QUIET APPLIANCE CLUTCH

[75] Inventors: Chun W. Chan, Indianapolis; Robert F. Weaver, Brownsburg, both of Ind.

[73] Assignee: Emerson Electric Co., St. Louis, Mo.

[21] Appl. No.: 567,733

[22] Filed: Dec. 5, 1995

Related U.S. Application Data

[63] Continuation of Ser. No. 95,323, Jul. 21, 1993, abandoned.

[51] Int. Cl.⁶ ........................................... F16D 7/00
[52] U.S. Cl. .............................. 464/37; 192/56.1; 192/79
[58] Field of Search ...................... 464/30, 37, 42; 192/56.1, 55.3, 43, 415, 79, 54.5

[56] References Cited

U.S. PATENT DOCUMENTS

| | | | |
|---|---|---|---|
| 2,464,477 | 3/1949 | Aasland | 464/37 |
| 2,501,648 | 3/1950 | Ogden | 464/37 |
| 3,413,876 | 12/1968 | Shinn | 192/79 |
| 3,797,621 | 3/1974 | James | 192/56 |
| 4,702,122 | 10/1987 | Richard | 74/412 TA |
| 4,835,978 | 6/1989 | Cole | 62/137 |
| 5,000,721 | 3/1991 | Williams | 464/37 |
| 5,088,581 | 2/1992 | Duve | 192/46 |
| 5,099,970 | 3/1992 | Harris | 464/37 |

*Primary Examiner*—John P. Darling
*Assistant Examiner*—Eileen A. Dunn
*Attorney, Agent, or Firm*—Eric R. Waldkoetter

[57] ABSTRACT

The clutch is an integral gear stage in a subfractional horsepower motor gear train that is used in an appliance such as an icemaker or cam-operated timer. The clutch has an inner member with arc-shaped springs that carry curved protrusions and an outer member with sinusoidally shaped contours. The curved protrusions engage the sinusoidally shaped contours to permit the clutch to transmit torque to an appliance component. When the torque applied to the clutch exceeds a predetermined level, the curved protrusions disengage from the contours and permit the inner member to rotate independently from the outer member. The curved protrusions disengage from the sinusoidally shaped contours and then reengage the sinusoidally shaped contours causing the arc-shaped springs to compress and extend as a function of the sinusoidally shaped contours, gradually compressing and gradually extending, thereby reducing vibration and noise.

11 Claims, 8 Drawing Sheets

QUIET APPLIANCE CLUTCH

This application is a continuation of Ser. No. 08/095,323, filed Jul. 21, 1993, now abandoned.

BACKGROUND

This invention relates to torque limiting devices and more specifically a gear having a torque limiting clutch used in a power transmission gear train.

Household appliances use subfractional horsepower electric motors to operate mechanisms for performing a variety of appliance functions. For example a refrigerator freezer icemaker uses a subfractional horsepower motor to operate a harvest rake for ejecting ice cubes, and a cam-operated timer control uses a subfractional horsepower motor to rotate a camstack for switching appliance functions. Subfractional horsepower motors used in appliances typically use a gear train to slow rotational speed and multiply torque to operate appliance mechanisms. Appliance devices driven by subfractional horsepower motors can encounter restrictions such as when an icemaker harvest rake encounters ice cubes that do not immediately eject, or an appliance operator manually operates an icemaker harvest rake, or when an appliance operator rotates a control knob to set a cam-operated timing mechanism. If an appliance device driven by a motor becomes obstructed in some manner, the torque delivered through the gear train can become great enough to strip gear teeth causing damage to the appliance, gear train, or motor.

Torque limiting clutches have been used for many years in household appliances such as in a refrigerator freezer icemakers and cam-operated timers for such appliances as clothes dryers, clothes washing machines, and dishwashers to prevent a temporary obstruction from damaging the appliance, gear train, or motor.

Some previous appliance clutches have used flexible fingers on an annular member to engage lugs on another annular member. Such a design typically provides a unidirectional clutch. When the torque applied exceeds a predetermined value the flexible fingers flex to store energy and then release from the lugs nearly instantaneous to permit slippage. Both the flexible fingers and lugs are often shaped with thin or sharp edges that have a propensity to vibrate particularly when the flexible finger disengages from a lug and quickly release energy. The energy released includes components that vibrate at audio frequencies that can be heard near the appliance, typically in a home. Additionally fine structure such as flexible fingers can increase production cost. An appliance clutch employing a flexible finger design is disclosed in U.S. Pat. No. 5,088,581 issued to Duve.

Some previous appliance clutches have used spring biased lobes on an annular member to engage sharp teeth on another annular member. Such a design provides a bi-directional clutch. When the torque applied to one of the annular members exceeds a predetermined valve, the spring biased lobes flex to disengage from the sharp teeth to permit slippage. Disengagement and reengagement of the lobes from the sharp teeth can cause vibration at audio frequencies that can be heard near the appliance. An appliance clutch employing spring biased lobes and sharp teeth is disclosed in U.S. Pat. No. 4,702,122 issued to Richard.

Some previous appliance clutches have employed metal spring discs with protuberances that engage slots formed in a wheel well. Both the protuberances and the slots are shallow, so there is limited spring flexing space for the metal spring discs to store energy. The metal spring discs are constructed from thin sheet metal. The protuberances engaging and disengaging from slots can cause the metal to vibrate at an audio frequency. An appliance clutch employing spring discs with protuberances that engage slots formed in a wheel well is disclosed in U.S. Pat. No. 3,797,621 issued to James.

Some previous ice maker have used a one-way clutch in a drive train between a motor and harvest rake mechanism. Although a one-way clutch will permit slippage if the harvest rake encounters an obstruction, if a person manually operates the harvest rake in an attempt for instance to dislodge it from an obstruction the person may move the harvest rake in a direction opposite normal operation possibly causing damage to the harvest rake motor or drive train. An ice maker that uses a one-way clutch is disclosed in U.S. Pat. No. 4,835,978 issued to Cole.

Previous appliance clutches such as those used in appliances such as icemakers and in cam-operated timers perform a torque limiting function but can be noisy when slipping. Additionally some previous clutches used in appliances such as an ice maker are only operational in one direction. What is needed is an appliance clutch that is quieter when slipping, bi-directional, easy to manufacture, and easy to change the predetermined torque limit by varying component design.

SUMMARY

I have invented an apparatus and method that satisfies the need for a quiet appliance clutch. The quiet appliance clutch comprises an outer member and an inner member. The outer member further comprises a gear wheel with gear teeth disposed circumferentially, an embossed rim integral to the gear wheel, and contours shaped into the embossed rim. The inner member further comprises a pinion gear having a bore engaging a center stem for a rotational axis and pinion teeth disposed circumferentially, arc-shaped springs extending from the pinion gear, and a protrusion on each arc-shaped spring for engaging the contours. The contours are sinusoidally shaped and cooperate with the protrusion to convert torque to tensional energy and tensional energy to torque in a sinusoidal function when slipping to reduce vibration.

The method for reducing operation noise in an appliance clutch comprises the following steps. An outer member and inner member as described above are provided. Torque is transmitted from the outer member to the inner member by the protrusion on the end of each arc-shaped spring staying engaged in a contour valley. The quiet appliance clutch slips when the torque exceeds a predetermined level by the protrusion on the end of each arc-shaped spring disengaging from contour valleys. If a protrusion breaks contact with the contours during slippage, the protrusion slideably reengages the contours to reduce vibration. The following are objects of the invention. Provide a quiet, bi-directional clutch. Provide a clutch that limits torque by converting torque into tensional energy and vice versa rather than requiring friction. Provide a clutch with less fine structural details for greater ease of manufacturing. Provide a clutch in which the predetermined torque value can easily be changed by modifying a few components such as the arc-shaped spring rate, protrusion shape, number of protrusion, and contour shape. Provide a clutch that if operated at a speed while slipping that causes a protrusion to break contact from the contours then the protrusion slideably reengages the contours to reduce vibration and noise.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
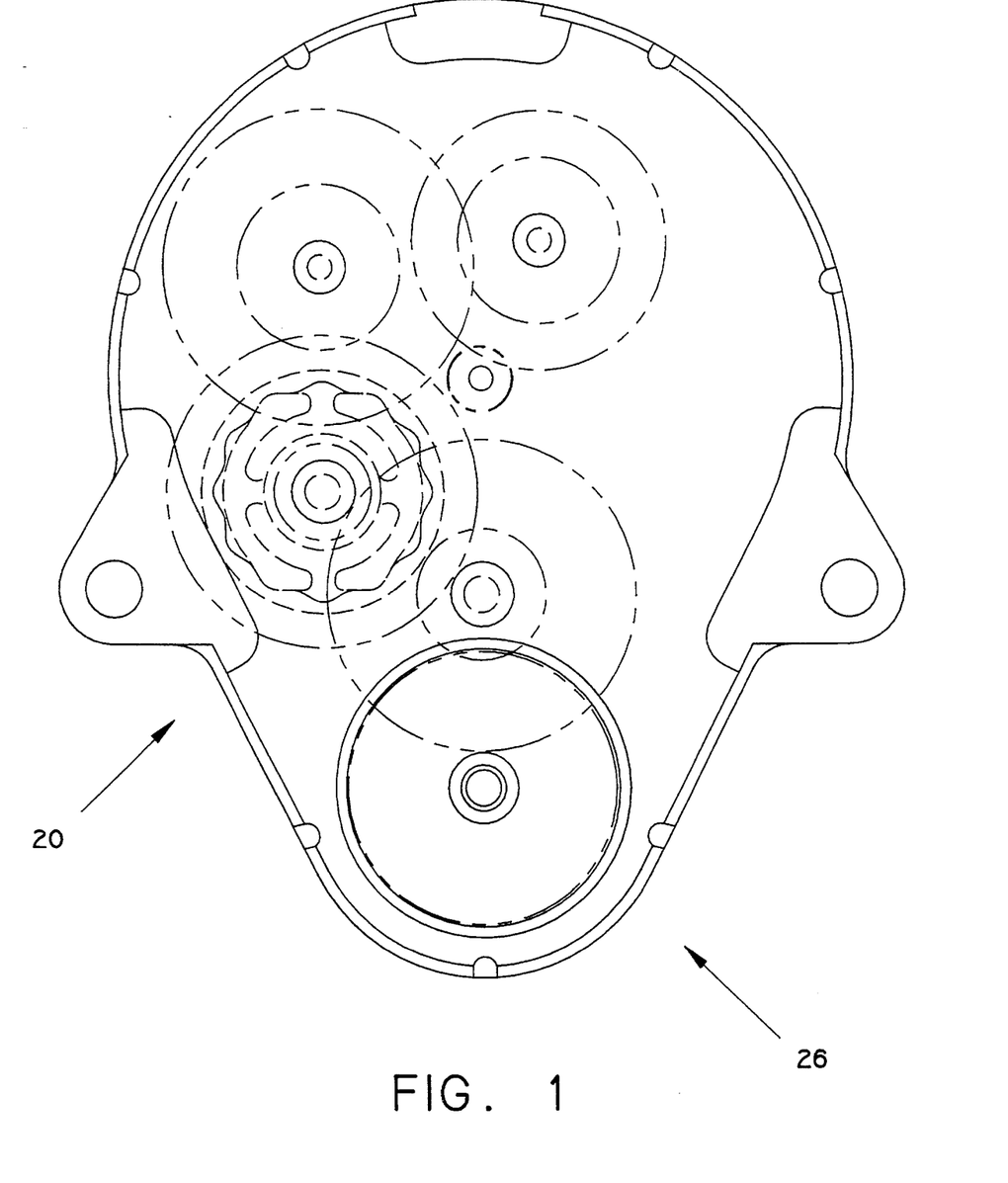
FIG. 1 shows a top view of a quiet appliance clutch installed in an icemaker harvest rake drive train.
Figure 2:
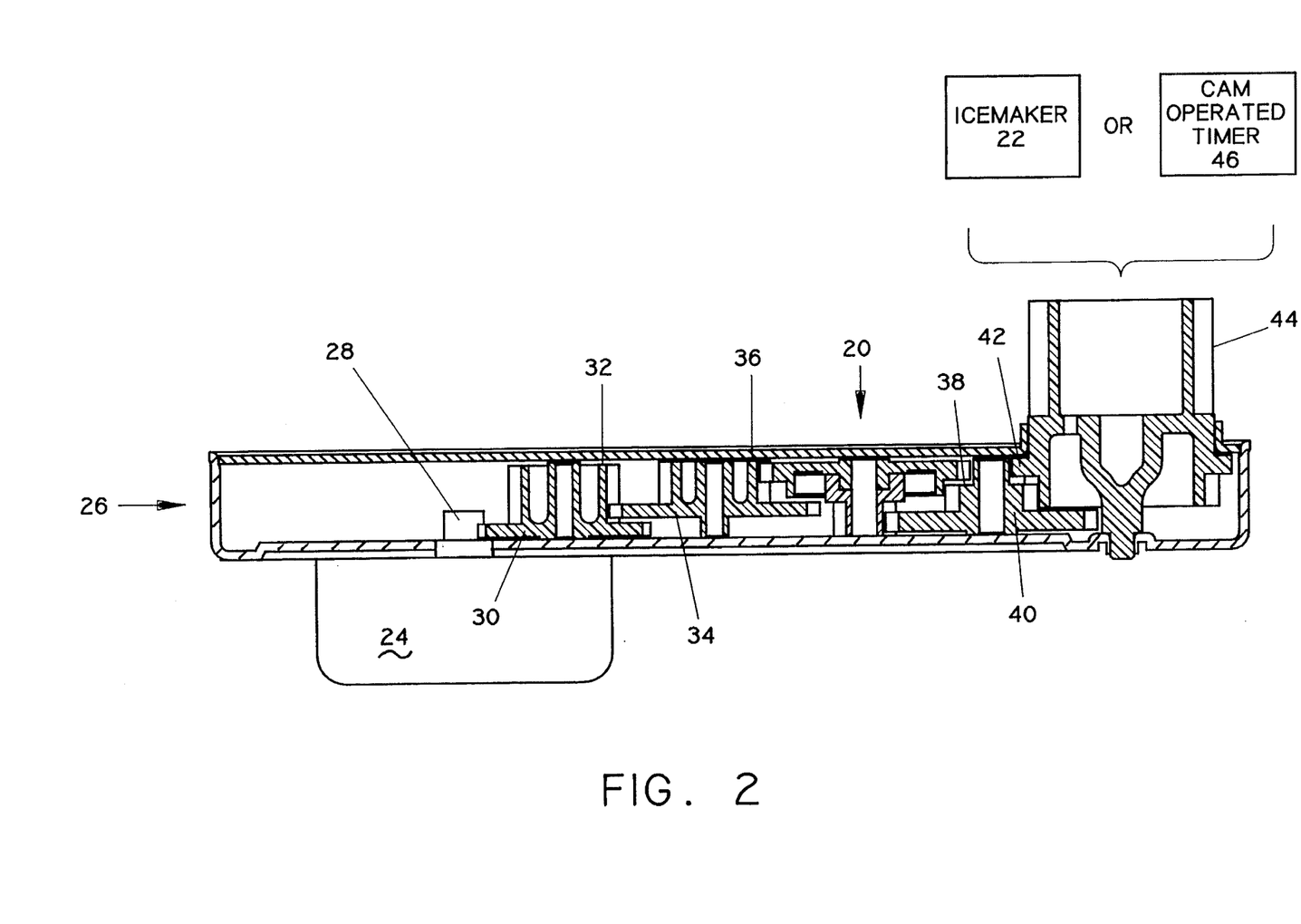
FIG. 2 shows a side view of the quiet appliance clutch installed in an icemaker harvest rake drive train.

Referring to FIGS. 1 and 2, a quiet appliance clutch 20 is shown in typical installation, a refrigerator freezer icemaker 22. The icemaker 22 uses a subfractional horsepower motor 24 such as a Mallory Controls A.C. permanent magnet, mechanical start motor part no. M001 available from Mallory Controls, P.O. Box 986, Indianapolis, Indiana 46206-0986, to drive a harvest rake to remove ice cubes from a freezing tray (not shown). The motor 24 uses a gear train 26 to reduce the motor's 24 operating speed. The motor 24 has a rotor pinion 28 that drives a first stage reduction gear 30, and a first stage reduction pinion 32 in turn drives a second stage reduction gear 34. A second stage reduction pinion 36 drives the clutch 20, and the clutch 20 drives a forth stage reduction pinion 38. A forth stage reduction gear 40 drives an output gear 42, and an output gear pinion 44 drive an ice maker 22 harvest rake mechanism (not shown). The output gear 42 and pinion 44 typically rotate at about one (1) rpm operating at about 60 inch-ounces (0.043 KgM) of torque.

The gear train 26 as well as many other icemaker 22 components are typically plastic to reduce production costs and gain other advantages associated with plastic such as corrosion resistance. During normal operation, for instance in a refrigerator icemaker 22, the torque applied by the motor 24 through its integral gear train 26 with clutch 20 is transfer to an icemaker 22 harvest rake without the clutch 20 limiting torque by slipping. The torque applied by the motor 24 to the clutch 20 will exceed a predetermined value, torque limit or slippage value, typically when ice cubes do not immediately eject from a freezing tray. Additionally some mechanical start motors 24 employ a motor stop arm (not shown), so the motor 24 will only operate in a single direction. If the motor 24 is forced to operate in an opposite direction by something such as a person manually operating the harvest rake, the motor 24 stop arm can be damaged.

The operation would be similar in a cam-operated timer 46 but the torque delivered by the motor 24 through a gear train 26 in a cam-operated timer 46 typically exceeds a predetermined value when an appliance operator manually rotates a cam-operated timer 46 control knob or when a switch operating on a cam malfunctions (not shown).

Figure 3:
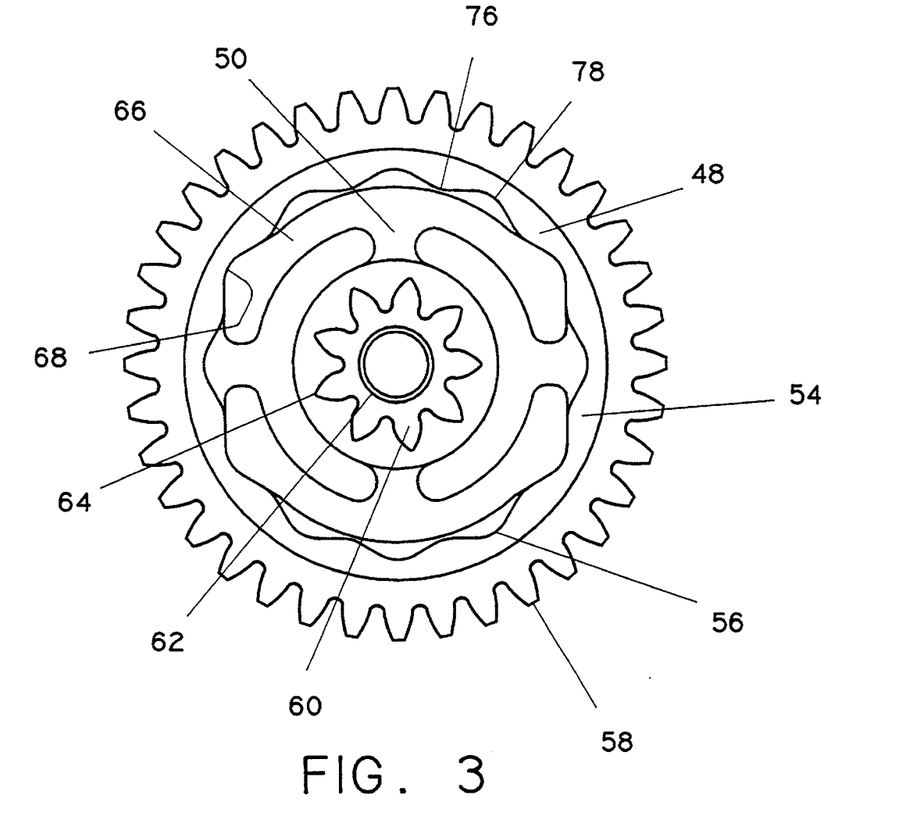
FIG. 3 shows a top view of the quiet appliance clutch.
Figure 4:
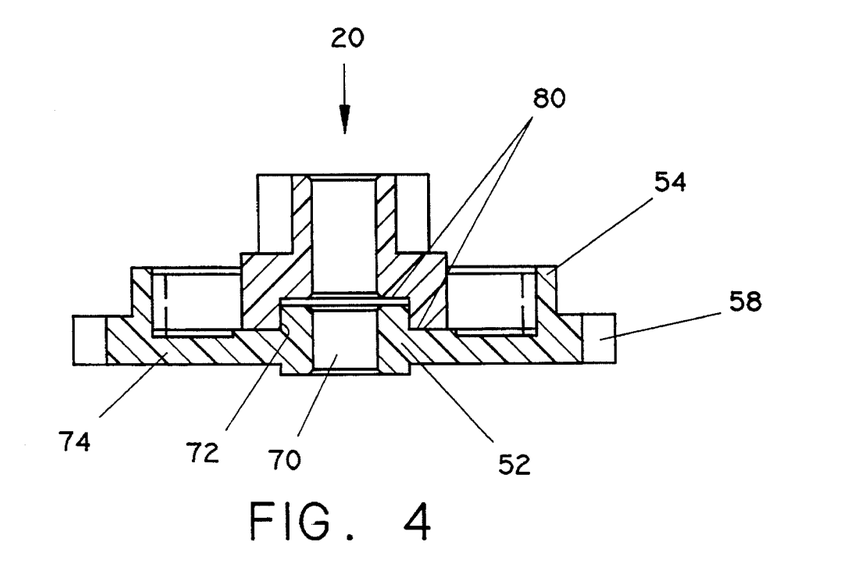
FIG. 4 shows a cut-away side view of the quiet appliance clutch.

Referring to FIGS. 3 and 4, the quiet appliance clutch 20 comprises an outer member 48 and an inner member 50. The outer member 48 comprises: a center stem 52 providing an axis for rotation, an embossed rim 54 concentric to the center stem 52, contours 56 formed on the interior of the embossed rim 54, and teeth 58 around the periphery of the outer member 48. The inner member 50 comprises: a pinion gear 60 having a bore 62 engaging the center stem 52 for a rotational axis and pinion teeth 64 disposed circumferentially, arc-shaped springs 66, functioning as cantilever springs, extending from the pinion gear 60, and a protrusion 68 on each arc-shaped spring 66 for engaging the contours 56 formed on the interior of the embossed rim 54. The structure of the outer member 48 and inner member 50 has fewer fine detail elements than clutches such as that disclosed in U.S. Pat. No. 5,088,581 issued to Duve for greater ease of manufacturing.

The outer member 48 is typically a single molded component preferably from an engineering thermoplastic such as Celcon® M270-14 available from Celanese® Engineering Resins, Inc., 26 Main Street, Chatham, N.J. 07928. The center stem 52 has an arbor hole 70 that is placed over a gear post (not shown) to provide an axis for rotation. The center stem 52 outer surface 72 is engaged by the pinion gear bore 62 to provide a rotational axis for the inner member 50. A web 74 joins the center stem 52 to the embossed rim 54. The interior of the embossed rim 54 contains contours 56 which form a series of sinusoidal-like shaped curves. The periphery of the outer member 48 has teeth 58 that typically engage an appliance component such as a reduction gear (not shown).

The outer member 48 has contours 56 formed on the interior of the embossed rim 54. Each contour hill 76 and valley 78 has preferably about a 0.05 inch (0.127 cm) radius, and the contour hill 76 apex is separated from another contour hill 76 apex by about 30°. The distance from a contour hill 76 apex to the deepest portion of a contour valley 78 is about 0.04 inch (0.102 cm). The outer member 48 provides outer surfaces 72 that serve as bearing surfaces for rotation of the inner member 50.

Figure 5:
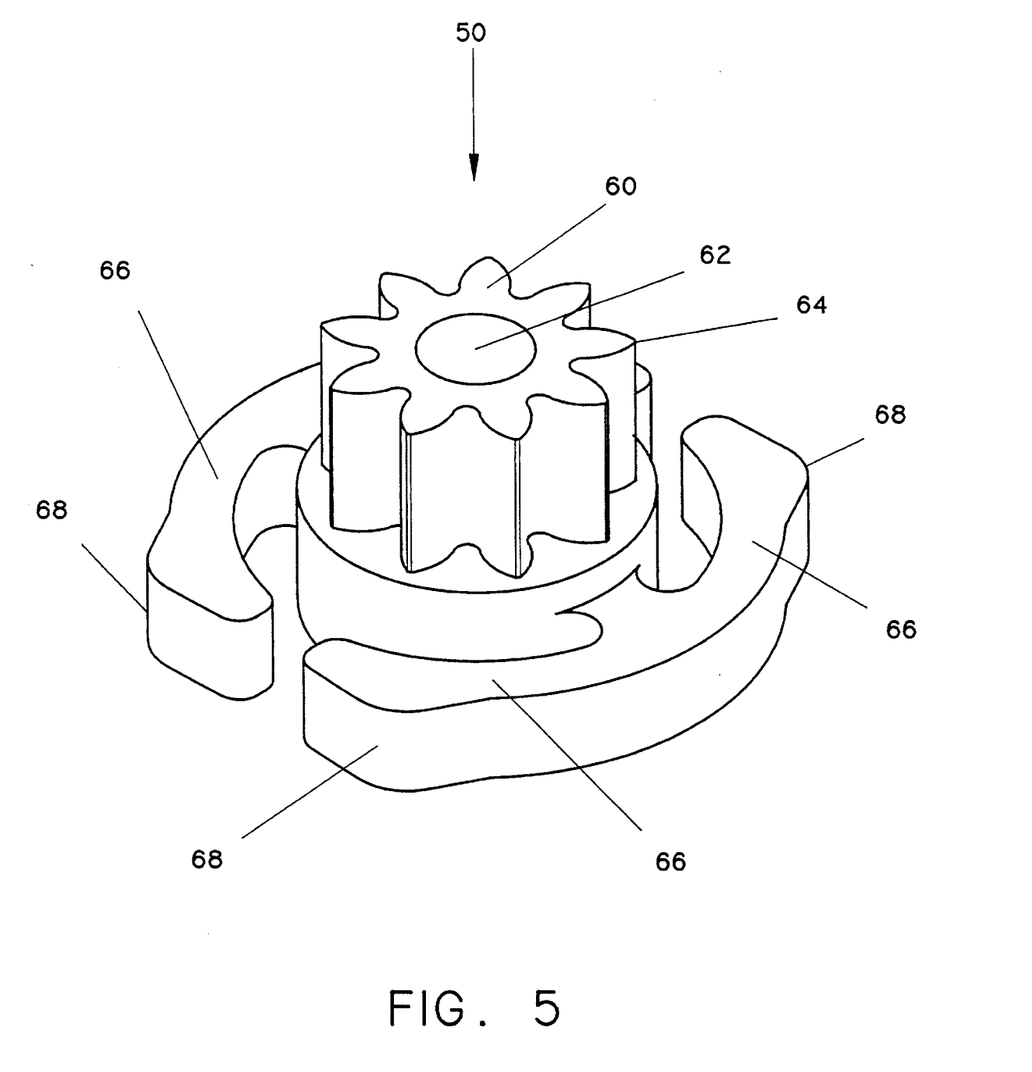
FIG. 5 shows an isometric view of the quiet appliance clutch inner member.
Figure 6:
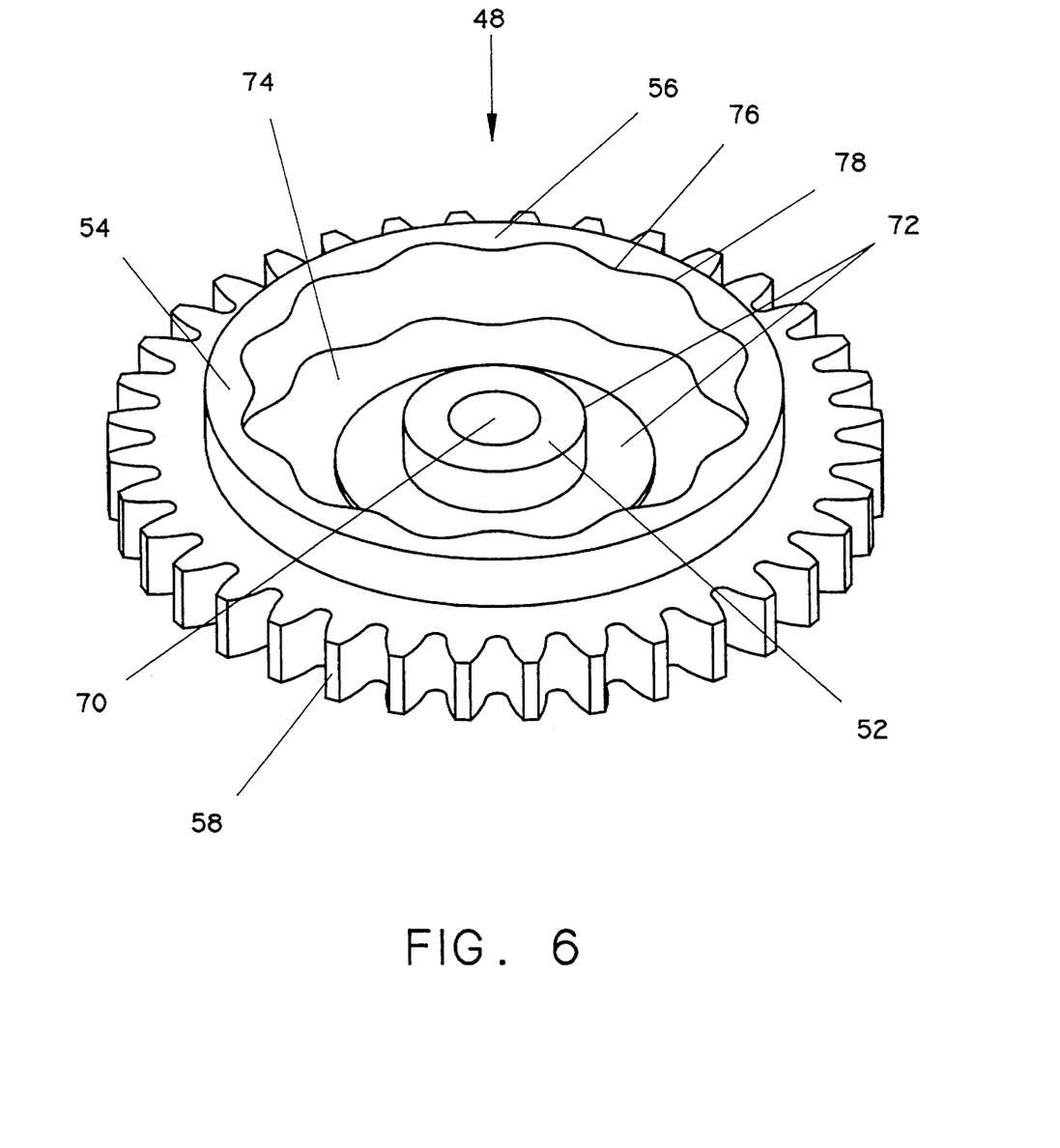
FIG. 6 shows an isometric view of the quiet appliance clutch outer member.

The inner member 50 is typically a single molded component preferably from a glass reinforced nylon for greater strength such as Celanese® 1503-2 nylon also available from Celanese® Engineering Resins, Inc. The protrusions 68 on the arc-shaped springs 66 are radiused to preferably 0.05 inch (0.127 cm) just as the contours 56 are radiused to provide maximum contact. The protrusions 68 extend about 0.05 inch (0.127 cm) from the outer diameter of the arc-shaped springs 66. The arc-shaped springs 66 could be designed to carry more protrusions 68 to change the predetermined torque limit. There could also be more arc-shaped springs 66 to carry a larger number of protrusions 68. The arc-shaped springs 66 could have a higher spring rate to increase the predetermined torque limit. The protrusion 68 could also have a sharper, smaller radius to extend deeper into a contour 56 to increase the predetermined torque limit. The inner member 50 provides bearing surfaces 80 that cooperate with outer member 48 outer surfaces 72 for rotation of the inner member 50 when the clutch 20 slips.

Figure 7:
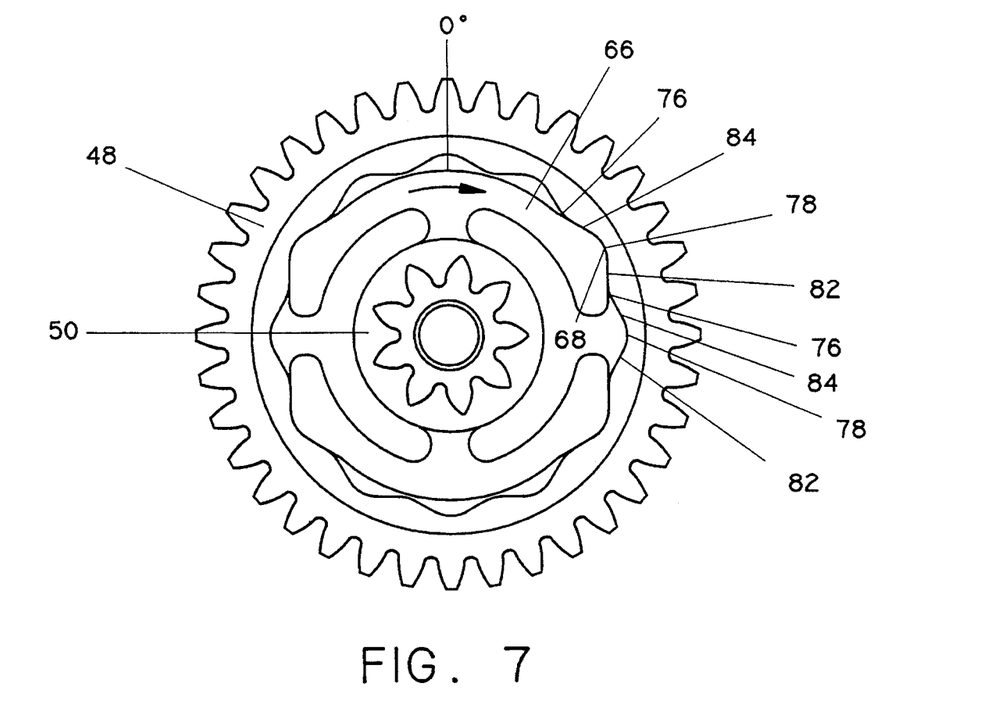
FIG. 7 shows the quiet appliance clutch inner member at 0° rotation.

Operation of the clutch 20 is now described referring to FIGS. 7–12. Although only one arc-shaped spring 66, and protrusion 68 will be described for simplicity, the same operational description would apply to the other arc-shaped springs 66 and protrusions 68. Referring to FIG. 7, when torque applied to the clutch 20 is less than the predetermined torque limit, i.e., less than the amount to cause slippage, torque is transmitted from the outer member 48 to the inner member 50 by the protrusion 68 on the arc-shaped spring 66 staying engaged in a contour valley 78. The arc-shaped spring 66 provides sufficient beam pressure to the protrusions 68 on the end of each arc-shaped spring 66 so the protrusion 68 remains basically stationary in the contour valleys 78, so the clutch 20 transmits torque to a driven component.

Figure 8:
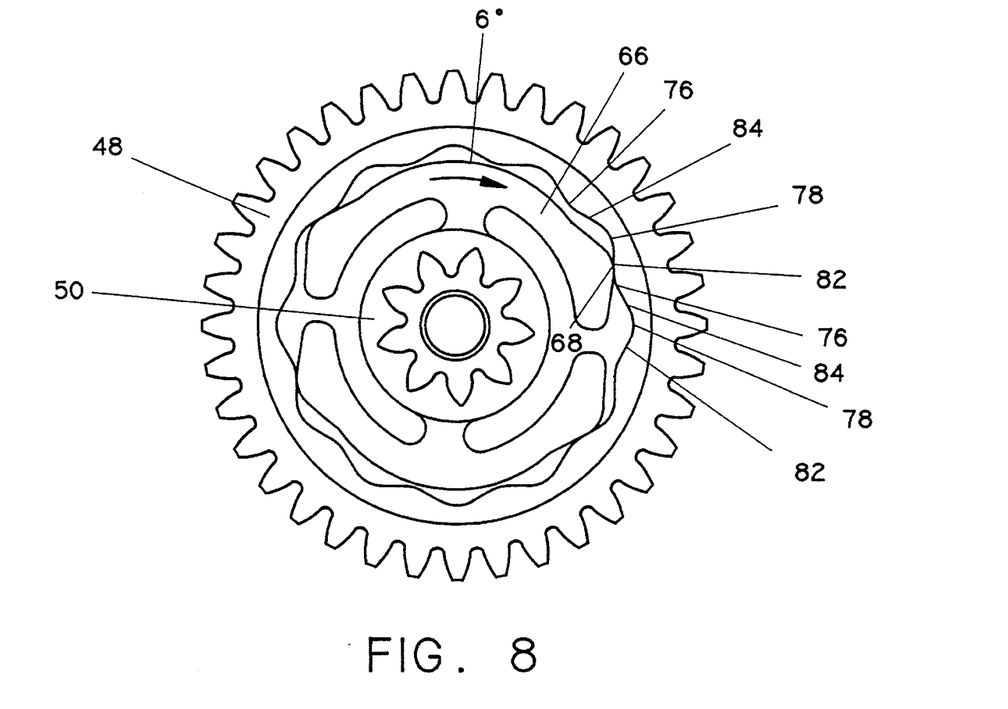
FIG. 8 shows the quiet appliance clutch inner member at 6° rotation.
Figure 9:
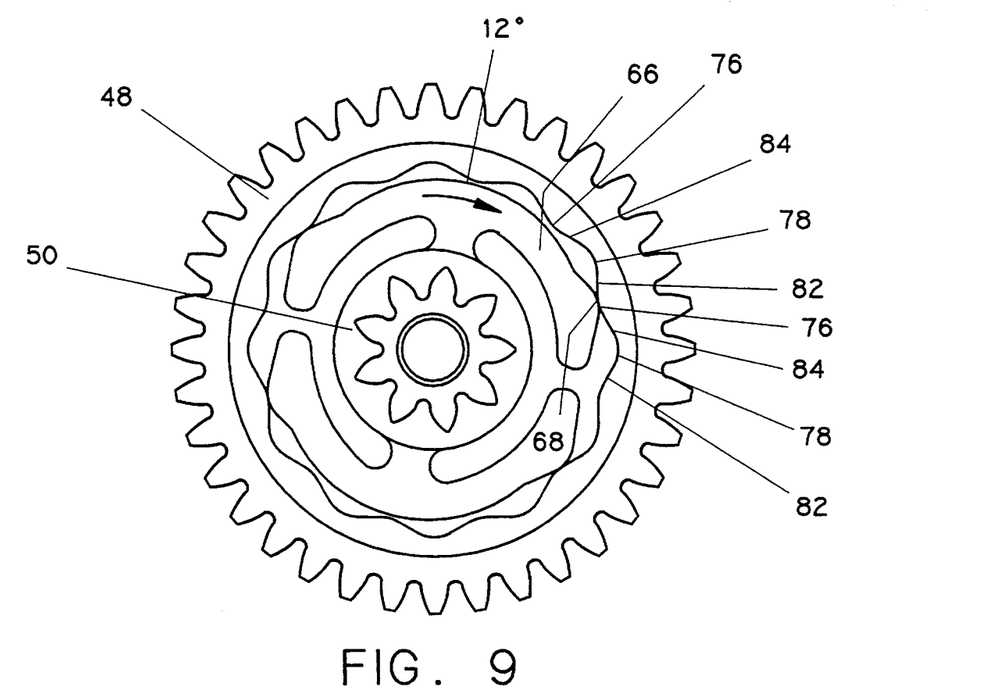
FIG. 9 shows the quiet appliance clutch inner member at 12° rotation.

When torque applied to the clutch 20 exceeds the predetermined torque limit, i.e., great enough to cause slippage, the protrusion 68 on the arc-shaped spring 66 disengages from the contour valley 78. The predetermined slip torque for the clutch 20 is preferably about 2–6 inch-ounces (0.0014–0.0043 KgM) of torque for use in an icemaker 22, although the clutch 20 could be designed with a different predetermined slip torque. The beam pressure delivered by the arc-shaped spring 66 to the protrusion 68 is insufficient to keep the protrusion 68 in the contour valley 78. Referring to FIG. 8, when slippage begins the protrusion 68 begins climbing the contour uphill slope 82 toward the contour hill 76. As the protrusion 68 begins moving up the uphill slope 82, the arc-shaped spring 66 is compressed which converts torque to tensional energy. Additionally, the where the protrusion 68 contacts the uphill slope 82 some torque may be converted by friction into heat. Referring to FIG. 9, when the protrusion 68 has completed climbing the uphill slope 82 and is at the contour hill 76 apex, the arc-shaped spring 66 has stored the maximum tensional energy.

Figure 10:
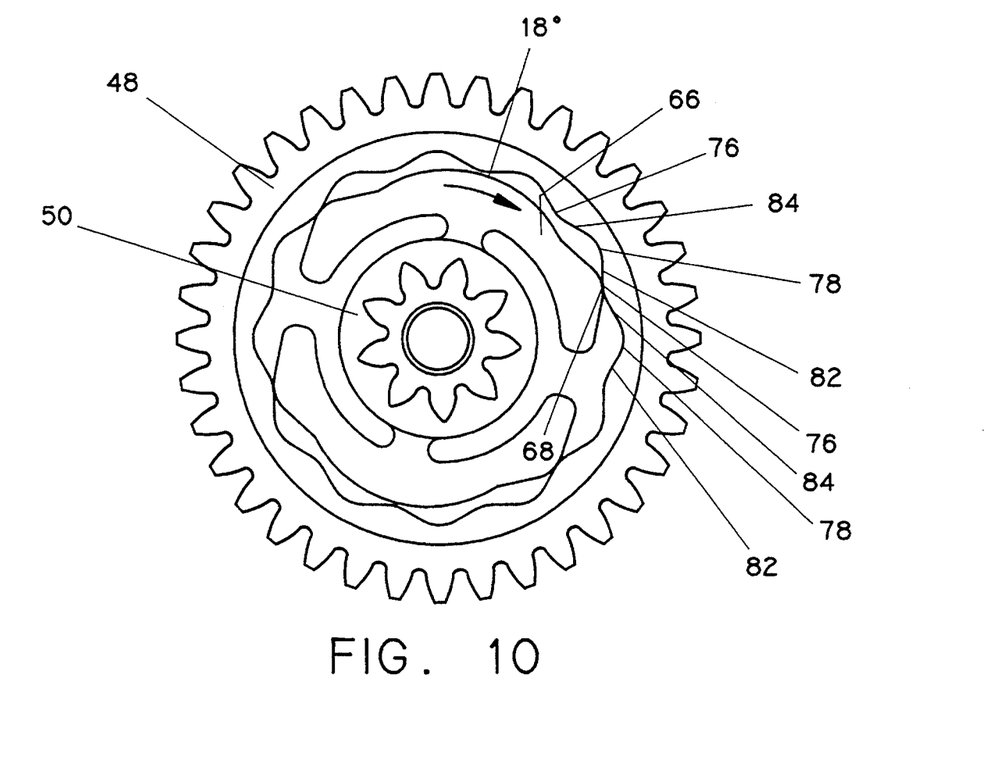
FIG. 10 shows the quiet appliance clutch inner member at 18° rotation.
Figure 11:
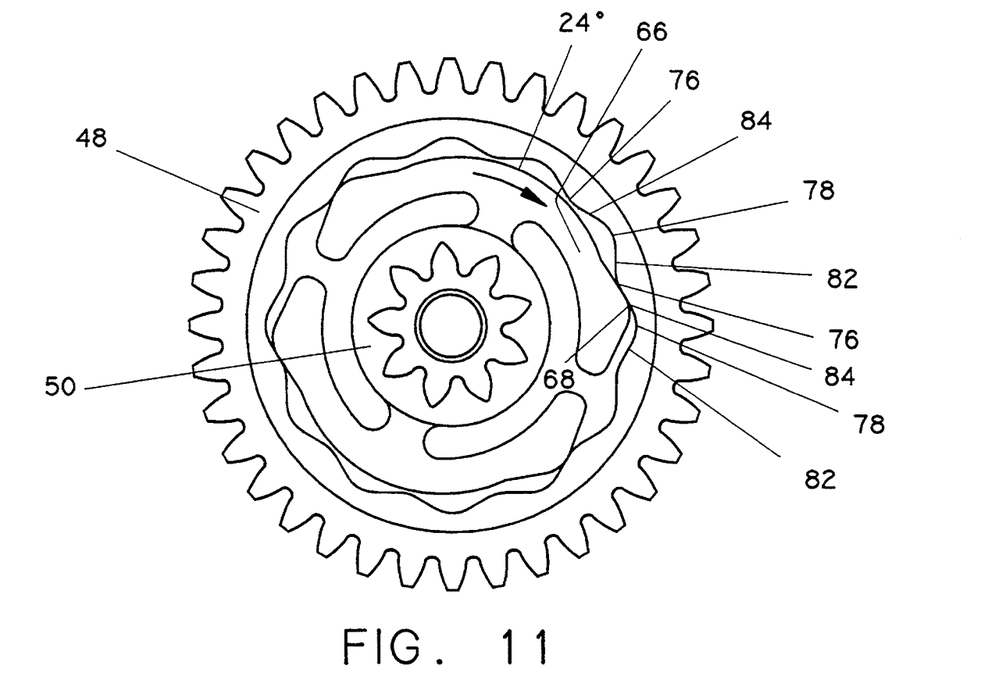
FIG. 11 shows the quiet appliance clutch inner member at 24° rotation.
Figure 12:
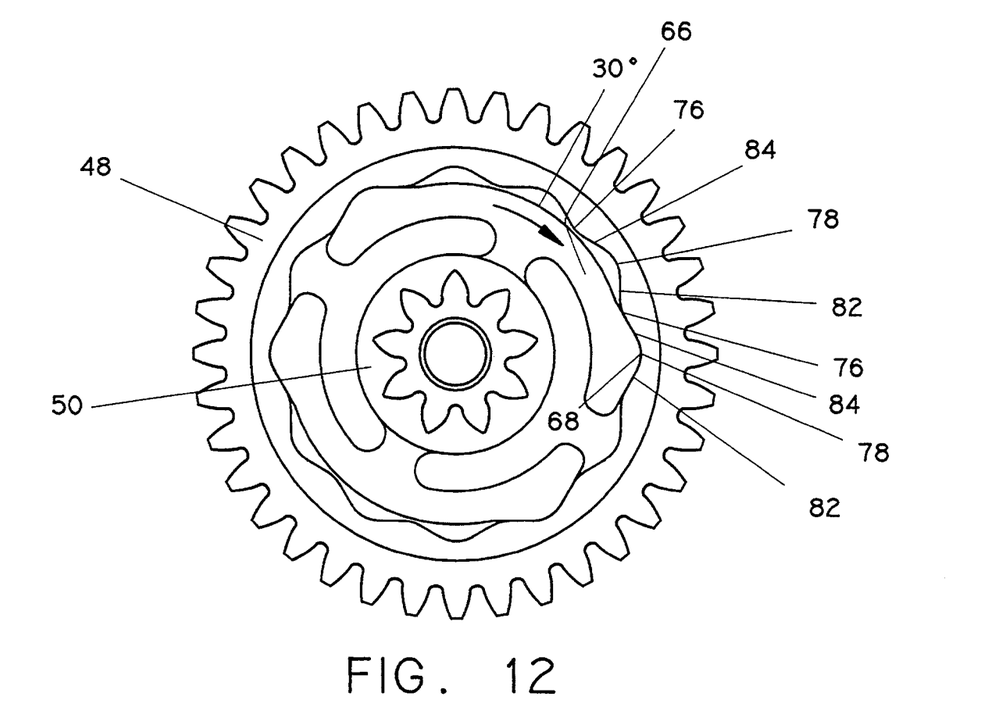
FIG. 12 shows the quiet appliance clutch inner member at 30° rotation.

Referring to FIG. 10–12, as the protrusion 68 begins to move down the contour downhill slope 82, the arc-shaped spring 66 beings gradually releasing tensional energy which drives the protrusion 68 down the downhill slope 84 into the contour valley 78. As described above when the clutch 20 slips the inner member arc-shaped springs 66 and protrusion 68 can be described as functioning like a cam follower and the outer member contours 56 function as a cam. An advantage of the invention is the gradual release of tensional energy by the arc-shaped spring 66 because a near instantaneous release of tensional energy is more prone to cause vibration and noise.

Since the contours 56 form a series of sinusoidal like shaped curves, when the clutch 20 slips causing the protrusion 68 to follow the contours 56 the arc-shaped spring 66 also stores and releases tensional energy as a function of the sinusoidal shaped contours.

By storing and releasing energy gradually, the arc-shaped spring 66 is less prone to vibrate at audio frequencies than if the the arc-shaped springs 66 had force applied or released more quickly. Additionally the protrusion 68 and contours 56 have gentle curves, without sharp edges, so the structure is less prone to vibration at audio frequency.

At slow speed rotation, when the torque applied to the clutch 20 is great enough to cause slippage, the protrusion 68 on the end of each arc-shaped spring 66 maintains near constant engagement with the contours 56.

At medium speed rotation, the protrusion 68 on the end of the arc-shaped spring 66 will quickly move from the contour hill 76 apex to the downhill slope 84 of a contour 56. The movement down the downhill slope 84 of a contour 56 may be quicker than the corresponding move up the uphill slope 82 of the contour 56, so the protrusion 68 may slow or decelerate quickly when encountering the uphill slope 82 of the contour 56. This deceleration may cause some vibration, but the rounded shape of the protrusion 68 and the contour 56 permit the protrusion 68 to slideably engage the uphill slope 82 of the contour 56 thus dissipating the tensional force over space and time thereby reducing noise.

At higher speed rotation the protrusion 68 on the end of each arc-shaped spring 66 may float when moving from the contour hill 76 apex to the downhill slope 84 of the contour 56. Even if floating occurs the rounded shape of the protrusion 68 and contour 56 permit the protrusion 68 to slidable reengage the contour 56 and apply force to the arc-shaped spring 66 in a gradual manner thereby reducing the noise.

The previously described versions of the present invention have many advantages, including: a clutch 20 that limits torque by converting torque into tensional energy and vice versa; a clutch 20 with few fine detail elements for greater ease of manufacturing; a clutch 20 that can have the predetermined torque value that can be changed by modifying a few components such as the arc-shaped spring 66 rate, protrusion 68 shape, number of protrusions 68, and contour 56 shape; and, a clutch 20 that if operated at a speed while slipping that causes a protrusion 68 to break contact from the contours 56 the protrusion 68 slideably reengages the contours 56 to reduce vibration and noise.

Although the present invention has been described in considerable detail with reference to certain preferred versions thereof, other versions are possible. For example a notch could be cut on one side of a protrusion 68 and one side of a contour 56 such that the clutch 20 would only operate, i.e., slip, in a single direction and not slip in the other direction when the notches are engaged. Any one or more of the following components could be altered to increase or decrease the torque applied to the quiet appliance clutch 20 to cause slippage: the number and shape of protrusions 68, the number and spring rate of the arc-shaped springs 66, and the number and shape of the contours 56.

What is claimed is:

1. A quiet appliance clutch, comprising:
    (a) an outer member, comprises:
        (1) a gear wheel having gear teeth disposed circumferentially,
        (2) an embossed rim integral with the gear wheel,
        (3) sinusoidally shaped contours integral with the embossed rim and,
    (b) an inner member, comprises:
        (1) a pinion gear having a bore engaging a center stem defining a rotational axis and the pinion gear having pinion teeth disposed circumferentially,
        (2) cantilever-shaped springs integral with the inner member extending from the pinion gear, and,
        (3) a protrusion integral with each cantilever-shaped spring engaging the contours so both the outer member and inner member rotate as a unit upon a common axis until a predetermined torque limit is reached and then the protrusion slips by slideably engaging the contours to convert torque to tensional energy in a sinusoidal function by the cantilever-shaped springs displace inwardly to store a bending moment and then to convert tensional energy to torque in a sinusoidal function by the cantilever-shaped springs releasing the bending moment reducing vibration because the protrusion slideably engages the contours maintaining substantial contact with the contours.

2. A quiet appliance clutch as recited in claim 1 wherein the contours form a cam and the cantilever-shaped springs and protrusion function as a cam follower to convert torque to tensional energy and tensional energy to torque in a sinusoidal function when slipping to reduce vibration.

3. A quiet appliance clutch as recited in claim 1 wherein torque is transmitted from the inner member to the outer member by the protrusion on the end of each cantilever-shaped spring staying engaged in the contours.

4. A quiet appliance clutch as recited in claim 1 wherein slippage occurs when torque exceeds a predetermined level by the protrusion on the end of each cantilever-shaped spring disengaging from the contours.

5. A quiet appliance clutch as recited in claim 1 wherein the quiet appliance clutch operates bi-directionally.

6. A quiet appliance clutch as recited in claim 1 wherein the cantilever-shaped springs comprise four arc-shaped springs.

7. A quiet appliance clutch as recited in claim 1 wherein the outer member and inner member are plastic.

8. A method for reducing operation noise in an appliance clutch, comprising the steps of:
   (a) providing an outer member, comprises:
      (1) a gear wheel having gear teeth disposed circumferentially,
      (2) an embossed rim integral with the gear wheel,
      (3) sinusoidally shaped contours integral with the embossed rim;
   (b) providing an inner member, comprises:
      (1) a pinion gear having a bore engaging a center stem defining a rotational axis and the pinion gear having pinion teeth disposed circumferentially,
      (2) cantilever-shaped springs integral with the inner member extending from the pinion gear, and,
      (3) a protrusion integral with each cantilever-shaped spring engaging the contours;
   (c) transmitting torque from the outer member to the inner member by the protrusion on the end of each cantilever-shaped spring staying engaged in a contour valley; and,
   (d) slipping when torque reaches a predetermined level then the protrusion slips by slideably engaging the contours to convert torque to tensional energy in a sinusoidal function by the cantilever-shaped springs displace inwardly to store a bending moment and then to convert tensional energy to torque in a sinusoidal function by the cantilever-shaped springs releasing the bending moment reducing vibration because the protrusion slideably engages the contours maintaining substantial contact with the contours.

9. The method as recited in claim 8 wherein the quiet appliance clutch operates bi-directionally.

10. The method as recited in claim 8 wherein the arc-shaped springs comprise four cantilever-shaped springs.

11. The method as recited in claim 8 wherein the outer member and inner member are plastic.

* * * * *